No. 626,069. Patented May 30, 1899.
C. E. LONGDEN.
STOPPER FOR WATER BAGS.
(Application filed Dec. 19, 1898.)

(No Model.)

Witnesses
J. H. Shumway
C. R. Paige

Charles E. Longden, Inventor
By Attys Earle Seymour

THE NORRIS PETERS CO., PHOTO-LITHO., WASHINGTON, D. C.

UNITED STATES PATENT OFFICE.

CHARLES E. LONGDEN, OF NEW HAVEN, CONNECTICUT, ASSIGNOR TO THE SEAMLESS RUBBER COMPANY, OF SAME PLACE.

STOPPER FOR WATER-BAGS.

SPECIFICATION forming part of Letters Patent No. 626,069, dated May 30, 1899.

Application filed December 19, 1898. Serial No. 699,644. (No model.)

*To all whom it may concern:*

Be it known that I, CHARLES E. LONGDEN, of New Haven, in the county of New Haven and State of Connecticut, have invented a new Improvement in Stoppers for Water-Bags; and I do hereby declare the following, when taken in connection with the accompanying drawings and the letters of reference marked thereon, to be a full, clear, and exact description of the same, and which said drawings constitute a part of this specification, and represent, in—

Figure 1:
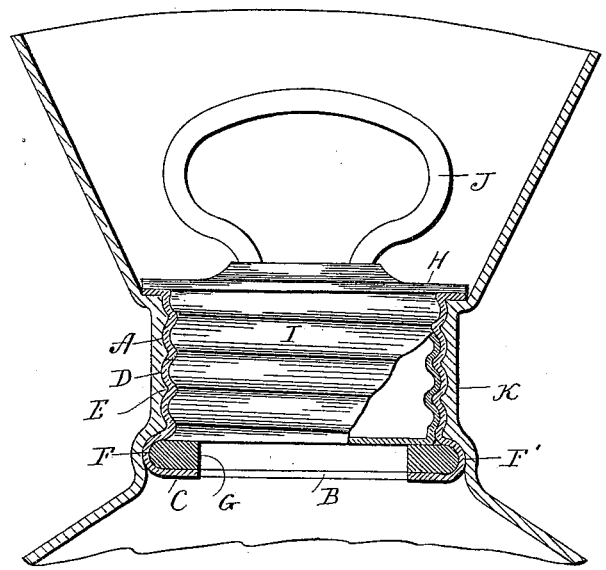
Figure 2:
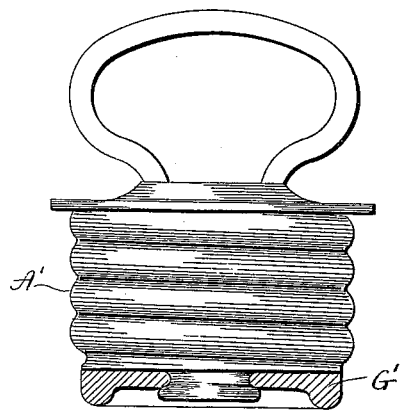

Figure 1, a view, partially in section and partially in side elevation, of a portion of a water-bag, showing my improved stopper applied thereto; Fig. 2, a side view of a well-known form of plug in which the washer is engaged with the plug, the washer being shown in section.

This invention relates to an improvement in stoppers for water-bags, and particularly such as comprise a nipple adapted to be secured in the mouth of the bag, a screw-plug fitting the interior of said nipple, and a washer between the lower edge of the plug and the nipple.

As is well known, rubber and brass when brought into close relation to each other will cause corrosion, which will unite one with the other. For this reason the nipples of water-bags are formed of brass, so that when the nipple is secured in the mouth of the bag it will adhere thereto and make a tight joint. For the same reason and to prevent corroding the stoppers are usually plated. In order to secure a tight joint between the plug and the nipple, a rubber washer is introduced, and this washer is generally riveted to the lower face of the plug or otherwise connected therewith, as shown in Fig. 2 of the drawings or as shown in United States Patent No. 525,853, dated September 11, 1894, and issued to my assignee, and so that when the plug is turned into the nipple the washer will be clamped between the lower end of the plug and the lower edge of the nipple and in close contact therewith. When thus forced into position, therefore, the rubber washer is in contact with the unplated metal of the nipple and is very liable to adhere thereto, so that if the washer is not firmly secured to the plug it will remain in the nipple or if firmly secured to the plug will prevent the ready removal of the plug. A further difficulty is experienced when the washer is not firmly secured to the plug by the displacement and loss of the washer while the plug is out of the bag and so that when the plug is inserted without the washer the bag will leak. Another difficulty met with is that the nipple becomes loose in the neck of the bag by the pressure of water between the nipple and the neck.

The object of this invention is to so form the nipple that the washer may be permanently located therein and so as to adhere thereto by corrosion, and whereby difficulty in removing the plug and danger of loss of the washer are avoided, and whereby also the nipple will be less liable to become detached from the neck of the bag; and it consists in the construction as hereinafter described, and particularly recited in the claim.

As shown in Fig. 1, the nipple A is of cup shape, having a circular opening B in its bottom C, and the side walls rolled to form internal screw-threads D and corresponding external grooves E, whereby it may be firmly secured in the mouth of the bag, which coming in contact with the unplated metal of the nipple will cause it to corrode, so as to firmly unite the nipple and bag together. At the bottom of the nipple the side walls are thrown outward, forming an internal annular chamber F and an external rib F'. Into the chamber F is forced a washer G, the opening in which corresponds to the opening in the bottom of the nipple, so as to give a clear inlet or outlet through the nipple. This washer being in close contact with the unplated metal of the nipple will soon cause the metal to corrode and so firmly unite the rubber to the metal, and thereby hold it in position, which position, however, would be maintained by the inwardly-projecting upper edge of the recess. The outwardly-projecting rib F' completely closes the space between the nipple and the neck K of the bag and so prevents the water from forcing its way between the nipple and the neck, as it sometimes does when the side walls of the nipple are comparatively straight. The plug H is of substantially the usual construction, consisting of a screw-threaded body $i$ and a handle J. This body is formed with a flat under face, which when turned into the nipple will rest upon the washer G, which packs the joint between the nipple and the plug and so prevents leakage between them. With this form of stopper the formation of the plug is simplified and the necessity of securing the washer thereto is avoided. As before stated, the washer is so held in the nipple that its displacement is difficult, and not being connected with the plug will not prevent the ready removal of the plug. As indicated above, Fig. 2 of the drawings illustrates a form of stopper substantially like that in the pattern above mentioned and in which the rubber washer G' is in the form of a ring secured to the lower edge of the body A' of the plug, and, as before stated, this washer when the plug is inserted into the nipple is liable to adhere to the nipple and so as to make the withdrawal of the plug difficult or is liable to displacement and loss when the plug is removed from the nipple.

Having fully described my invention, what I claim as new, and desire to secure by Letters Patent, is—

The combination with a water-bag, of a nipple secured in the neck thereof, and formed with an internal annular chamber, and a corresponding external rib at its lower end of greater diameter than the diameter of the main portion of the nipple, a washer located within the said chamber with which it corresponds in diameter, and a plug formed with a flat lower face adapted to bear upon the upper edge of said washer when the plug is turned into the nipple, substantially as described.

In testimony whereof I have signed this specification in the presence of two subscribing witnesses.

CHARLES E. LONGDEN.

Witnesses:
 FRED C. EARLE,
 LILLIAN D. KELSEY.